United States Patent
Voltz

(10) Patent No.: US 7,283,430 B2
(45) Date of Patent: Oct. 16, 2007

(54) SYSTEMS AND METHODS FOR OVERRIDING AN EJECTION LOCK

(75) Inventor: Christopher Voltz, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 762 days.

(21) Appl. No.: 10/811,221

(22) Filed: Mar. 26, 2004

(65) Prior Publication Data

US 2005/0213441 A1    Sep. 29, 2005

(51) Int. Cl.
*G11B 7/085* (2006.01)
*G11B 21/08* (2006.01)

(52) U.S. Cl. .............. 369/30.36; 369/30.43; 360/92; 720/673

(58) Field of Classification Search ............ 369/30.36, 369/30.43, 30.44, 30.45, 191.1, 193, 201, 369/77.11, 75.21, 30.9, 30.42; 360/92, 90.02, 360/90.03, 90.06; 720/673
See application file for complete search history.

(56) References Cited

U.S. PATENT DOCUMENTS 6,141,178 A * 10/2000 Nakajima et al. ............. 360/92
6,603,723 B2 * 8/2003 Minase ....................... 720/673

* cited by examiner

*Primary Examiner*—Ali Neyzari

(57) ABSTRACT

In one embodiment, a system and method for overriding an ejection lock pertain to detecting manipulation of an ejection control element signaling an intent to override the ejection lock, and overriding the ejection lock to enable storage medium ejection.

25 Claims, 5 Drawing Sheets

SYSTEMS AND METHODS FOR OVERRIDING AN EJECTION LOCK

BACKGROUND

Computers such as personal computers (PCs) typically comprise one or more storage media drives so that user data can be stored to a portable storage medium. Common storage media include, for example, floppy disks and compact discs (CDs). Such storage media are normally inserted into the user's computer, for instance in a front panel of the computer, so that the media can be engaged by a drive mechanism that drives the storage media. In the case of floppy disks and CDs, the media are spun by the drives. When the user wishes to withdraw a storage medium from the computer, the user typically presses an eject button that activates an ejection mechanism that ejects the medium from the computer so that the user may remove it.

Several years ago problems were encountered with premature ejection of storage media, and CDs in particular. Specifically, users would sometimes press the eject button before writing to the disc was completed. In one solution to that problem, a so-called "soft lock" is provided that temporarily disables the eject button so that the user cannot eject the disc until the operating system or (other control system) determines that it is appropriate to do so. In systems that implement such a soft lock, a disc can normally only be ejected when soft locked by actuating a manual release mechanism recessed behind a pinhole-sized opening in the drive front panel.

Although the soft lock feature can reduce data loss by preventing users from ejecting a disc or other storage medium prior to completion of writing to the medium, that feature can lead to user frustration. For instance, if the system-that operates the soft lock (e.g., operating system) experiences an error, it is possible that the soft lock feature will remain "stuck" in the activate state. In such a situation, the user may only be able to remove the medium by actuating the manual release mechanism or rebooting the computer. In the first case, the medium may be damaged in that manual ejection may result in ejection of a spinning medium. In the second case, the user may still lose data and must wait until the shut-down and reboot processes are completed.

SUMMARY OF THE DISCLOSURE

In one embodiment, a system and method for overriding an ejection lock pertain to detecting manipulation of an ejection control element signaling an intent to override the ejection lock, and overriding the ejection lock to enable storage medium ejection.

BRIEF DESCRIPTION OF THE DRAWINGS

The disclosed systems and methods can be better understood with reference to the following drawings. The components in the drawings are not necessarily to scale.

DETAILED DESCRIPTION

Disclosed herein are embodiments of systems and methods for overriding a storage medium ejection lock, such as a software-based compact disc (CD)(soft lock). In some embodiments, a storage medium drive includes an ejection control element, such as an eject button, that has two modes of operation, one in which activation equates to a typical ejection command that will be ignored when the ejection lock is active, and another in which activation equates to an ejection lock override command such that the storage medium will be ejected even if the ejection lock is active.

Figure 1:
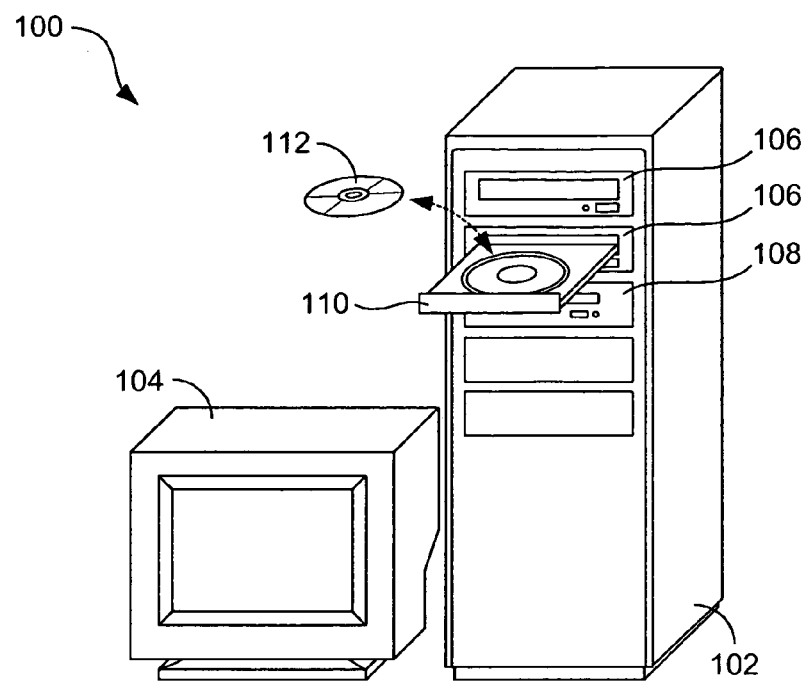
FIG. 1 is a perspective view of an embodiment of a computer system incorporating an ejection lock override.

Referring now to the drawings, in which like numerals indicate corresponding parts throughout the several views, FIG. 1 illustrates a computer system 100 that incorporates an ejection lock override. As indicated in that figure, system 100 comprises a computer box or simply "computer" 102 and a display 104. Although not illustrated in FIG. 1, the system may further comprise various user input devices such as a keyboard, mouse, and the like.

The computer 102 includes at least one storage medium drive. In the specific embodiment depicted in FIG. 1, the computer 102 comprises three such drives: two CD drives 106 and one floppy disk drive 108. Those particular drives are shown as an example only. The computer 102 could, of course, include greater or fewer such drives for CDs and floppy disks as well as for other types of storage media. As indicated in the figure, the CD drives 106 comprise disc trays 110 that extend outwardly from the computer 102 when an eject command is received. Once the tray 110 is extended, a disc 112 can be removed from or placed into the tray.

Figure 2:
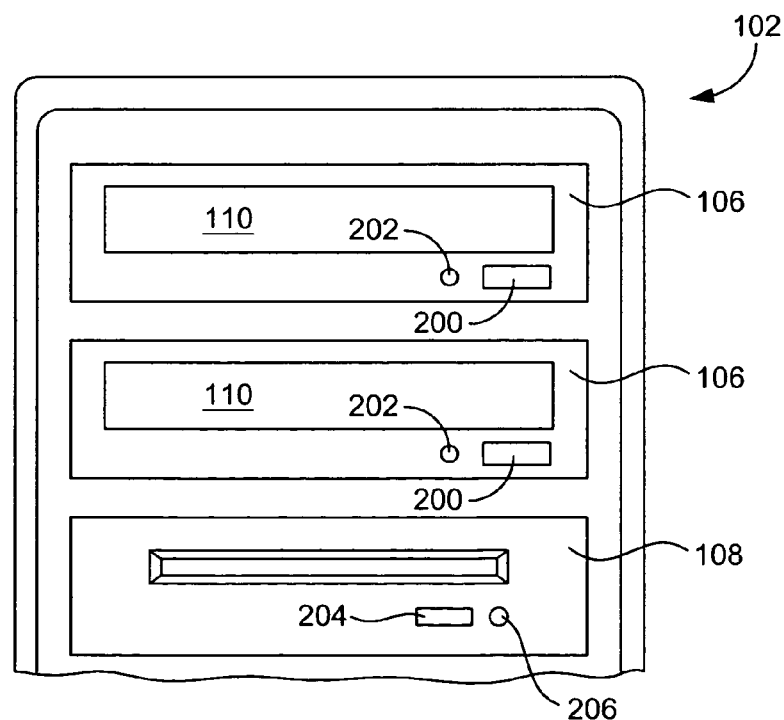
FIG. 2 is a partial view of a computer of the system shown in FIG. 1.

FIG. 2 illustrates a portion of the computer 102 in greater detail. As shown in that figure, each storage medium drive includes a finger-activated ejection control element that is used to eject storage media under normal operating conditions and a status indicator on the drive front panel. In particular, the CD drives 106 include eject buttons 200 and indicator lights 202 while the floppy disk drive 108 includes an eject button 204 and an indicator light 206. By way of example, the indicator lights 202 and 206 comprise light emitting diodes (LEDs). As is described in greater detail below, the ejection control elements (e.g., buttons) of the drives 106, 108 can be used to simply eject a storage medium contained within the drive when an ejection lock is not active or override an active ejection lock depending upon the manner in which the elements are activated or manipulated by the user. Therefore, a software-controlled lock can be overriden without the need to activate a manual release button that, when pressed, can result in damage to the storage medium.

Figure 3:
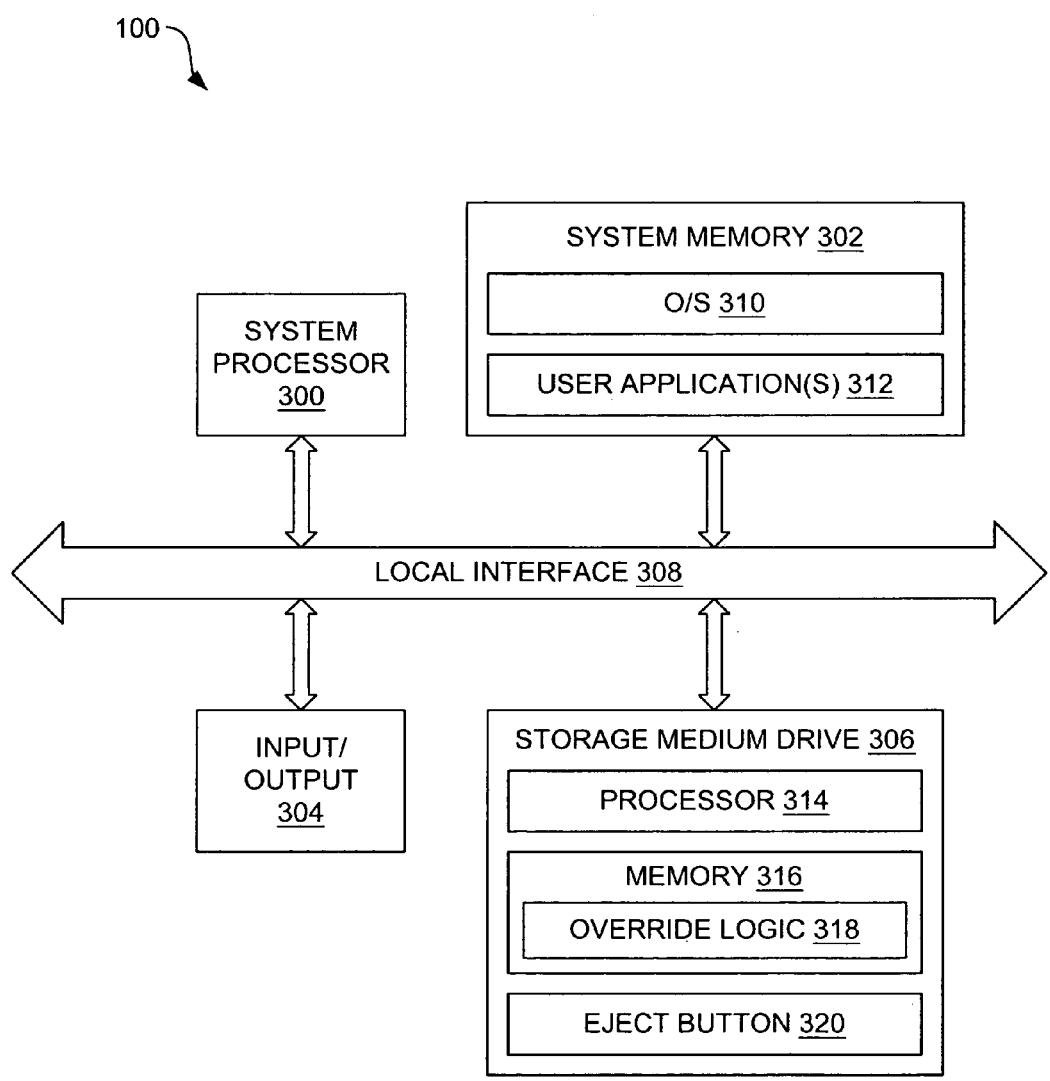
FIG. 3 is a block diagram of a specific embodiment of the computer system shown in FIG. 1.

FIG. 3 illustrates an example configuration for the computer system 100 of FIG. 1. As indicated in FIG. 3, the computer system 100 comprises a system processor 300, system memory 302, input/output devices 304, and a storage medium drive 306 (only one representative drive is shown in FIG. 3), each of which is connected to a local interface 308.

The system processor 300 can include a central processing unit (CPU) or an auxiliary processor among several processors associated with the computer system 100. The system memory 302 includes any one of or a combination of volatile. memory elements (e.g., RAM) and nonvolatile memory elements (e.g., read only memory (ROM), Flash memory, hard disk, etc.).

The I/O devices 304 comprise the components with which inputs and outputs can be exchanged between the computer system 100 and a user or another device. In terms of user input and output, the devices 304 may, for example, comprise a keyboard, mouse, and monitor. In terms of device input and output, the devices 304 may, for example, comprise various ports, a modem, wireless transceiver, a telephonic interface, and a network card.

The memory 302 comprises various programs, for instance in software, including an operating system 310 and one or more user applications 312. The operating system 310 controls the execution of other software and provides scheduling, input-output control, file and data management, memory management, and communication control and related services. In addition, the operating system 310 may control ejection of one or more storage medium drives so as to disable certain ejection requests. The nature of the user application(s) 312 depends upon the particular software configuration of the computer 102.

The storage medium drive 306 includes an ejection mechanism (not indicated in FIG. 3), a processor 314 (such as a microprocessor), and memory 316. By way of example, the processor 314 and memory 316 are contained within a single computer chip provided on the drive 306. The memory 316 may comprise nonvolatile, solid-state memory. In some embodiments, the memory 316 may comprise flash memory or electrically erasable programmable read-only memory (EEPROM). As is indicated in FIG. 3, the memory 316 comprises ejection lock override logic 318 that can be executed by the processor 314 in response to an appropriate activation of the eject button 320 to enable ejection of the medium drive 306 even when an ejection lock is active.

Various programs (logic) have been described above. These programs can be stored on any computer-readable medium for use by or in connection with any computer-related system or method. In the context of this disclosure, a computer-readable medium is an electronic, magnetic, optical, or other physical device or means that contains or stores a computer program for use by or in connection with a computer-related system or method. Programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 4:
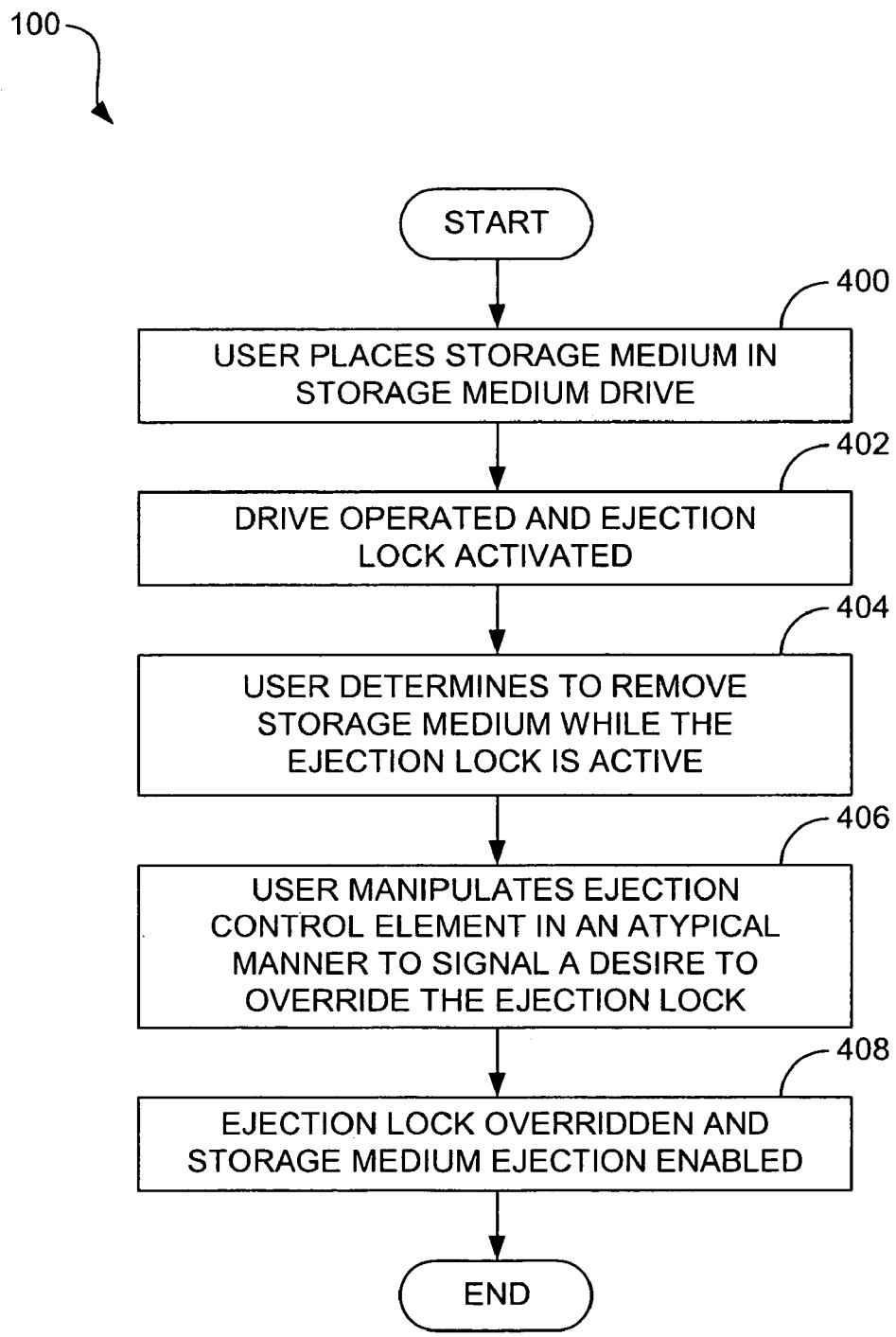
FIG. 4 is a flow diagram that illustrates an embodiment of a method for overriding an ejection lock.

FIG. 4 is a flow diagram that provides an overview of a method for overriding an ejection lock, such as a software-controlled lock (soft lock), that is active for a given storage medium drive. Process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 400 of FIG. 4, the user places a storage medium in the storage medium drive. The type of storage medium and storage medium drive may depend upon the particular situation. By way of example, the storage medium can be a CD (e.g., CDROM, CD-R, CD-RW) and the drive can be a CD drive. Notably, other storage media and media drives are possible. In general, the media drive comprises any drive in which ejection can be locked or disabled, for instance under software control. Therefore, the media drive could comprise a floppy disk drive or a solid-state storage medium (e.g., flash card) "drive" in cases in which those drives are equipped with a lock that disables normal ejection.

Referring next to block 402, the drive is operated and, therefore, the ejection lock is activated. Drive operation may occur in several different situations. For example, operation may occur when the storage medium is first inserted into the drive so as to read the medium's contents. Operation can further occur when a write or read command is entered by the user and/or issued by the operating system. As noted above, the ejection lock may comprise a software-controlled lock that is operated by the computer operating system and that functions by simply disabling, or ignoring selection of, the ejection control element (e.g., eject button) on the front panel of the drive.

Next, with reference to block 404, the user determines to remove the storage medium while the ejection lock is active. By way of example, that determination may be made when an error is experienced by the operating system that causes the ejection lock to remain in the active state and therefore prevent removal of the storage medium. As noted above, such a condition could previously only be overcome by either actuating a manual release mechanism or by rebooting the computer in which the drive is provided.

The user then manipulates the ejection control element on the drive front panel in an atypical manner so as to signal a desire to override the ejection lock, as indicated in block 406. The ejection control element comprises that element that is normally used to eject the storage medium, as contrasted with a manual release mechanism such as that recessed behind a pinhole opening. In most cases, the ejection control element simply comprises front panel eject button, such as eject button 200 or 204 illustrated in FIG. 2.

The manipulation of the ejection control element is described as "atypical" in that such manipulation can be distinguished from normal manipulation or selection of the element. The reason for this is to prevent accidental override of the ejection lock, for example when the button is accidentally bumped, and to only permit the user to knowingly override. Accordingly, the ejection lock is not completely deactivated and will prevent ejection of the control medium when the control element is used in the normal manner. To cite an example, when the user simply pushes an eject button a single time when the ejection lock is active, the storage medium will not be ejected. However, when that same eject button is manipulated in the appropriate atypical manner, the ejection lock will be overridden such that the storage medium can be ejected.

What constitutes appropriate atypical manipulation of the ejection control element depends upon the particular configuration of the storage medium drive. In one embodiment, atypical manipulation can comprise pressing and holding the ejection control element (e.g., button) for a predetermined period of time. For example, an eject button on the drive front panel could be pressed and held for a period of about 5-10 seconds before overriding is enabled. Such manipulation is atypical in that eject buttons are normally depressed only for a fraction of a second as in a finger "punch." In another embodiment, atypical manipulation can comprise pressing the ejection control element repeatedly in a predetermined period of time. For example, an eject button on the front panel of the drive could be pressed 3-5 times in a period of 2-3 seconds to signal an override command. In yet another embodiment, atypical manipulation can comprise both extended and multiple pressions. For instance, a particular sequence of long and short presses similar to Morse code could be used to convey a desire to override the ejection lock. Notably, in each case in which the duration that a control element is selected is significant, the drive processor's internal clock(s), an external timer, or another appropriate timing device can be used to track the passage of time.

Other possibilities for atypical manipulation are possible. Generally speaking, any form of manipulation that is different from normal manipulation. (e.g., a single press) could be used to signal the user's intent to override the ejection lock.

Referring next to block 408, the ejection lock is overridden as a consequence of the atypical manipulation of the ejection control element such that storage medium ejection is enabled. A further action could be required to actually eject the storage medium. For instance, a further depression of the ejection control element could be required to eject the storage medium once the ejection lock has been overridden. Alternatively, ejection is not only enabled but further occurs automatically. To avoid damage to a moving storage medium (e.g., CD), movement (e.g., spinning) of the storage media can be halted prior to ejection. Such halting of the storage media normally does not significantly delay ejection of the storage medium.

Figure 5:
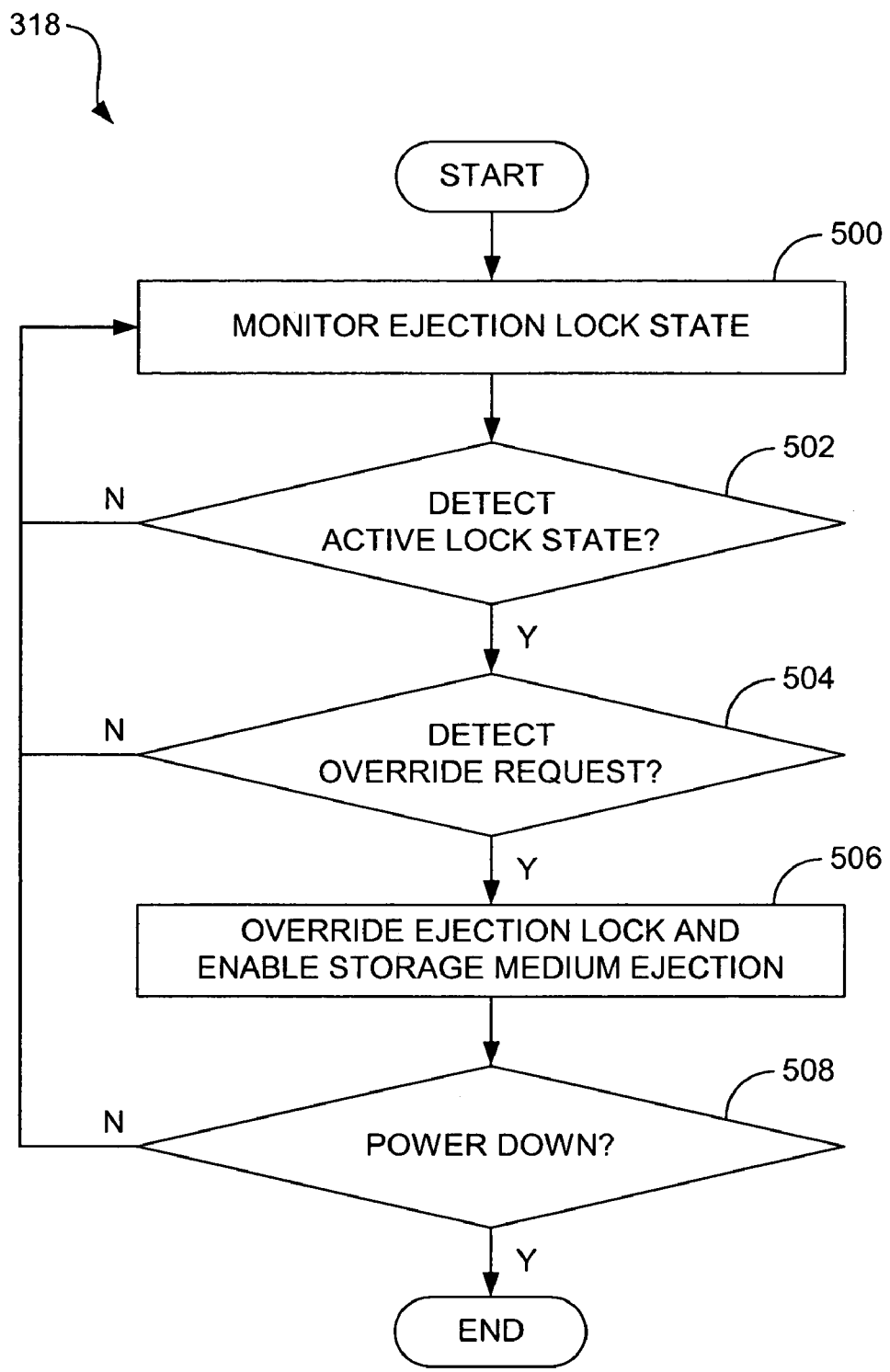
FIG. 5 is a flow diagram that illustrates an embodiment of operation of override logic shown in FIG. 3.

FIG. 5 is a flow diagram of an embodiment of operation of the override logic 318 shown in FIG. 3. Beginning with block 500, the override logic 318 monitors the ejection lock state of the storage medium drive to determine whether the ejection lock is active, as indicated in decision block 502. If the ejection lock is not active, i.e., the storage medium can be ejected by normal manipulation of the ejection control element, flow returns to block 500 for continued monitoring.

With further reference to decision block 502, if an active lock state is detected, flow continues to decision block 504 at which the override logic 318 determines whether an override request has been made. Specifically, the override logic 318 determines whether the ejection control element has been manipulated by a user in an atypical manner that communicates a desire to override the ejection lock. If not, no overriding action is taken and flow returns to the monitoring of block 500. If an override request is detected, however, flow continues to block 506 at which the logic 318 overrides the ejection lock and, therefore, enables storage medium ejection. Overriding the ejection lock equates to execution of a command (e.g., stored in memory 316, FIG. 3) that takes precedence over the ejection lock command, which for example was issued by the computer operating system (e.g., operating system 310 in FIG. 3). Such execution is possible due to the presence of the dedicated processor and memory of the drive. As described above, ejection can then occur automatically or upon some further action on the part of the user.

Turning next to decision block 508, the override logic 318 determines if a power-down sequence has begun, either for the drive or the computer system as a whole (as in the case of a reboot). If not, monitoring is resumed (block 500). If so, flow for the session is terminated.

Figure 6:
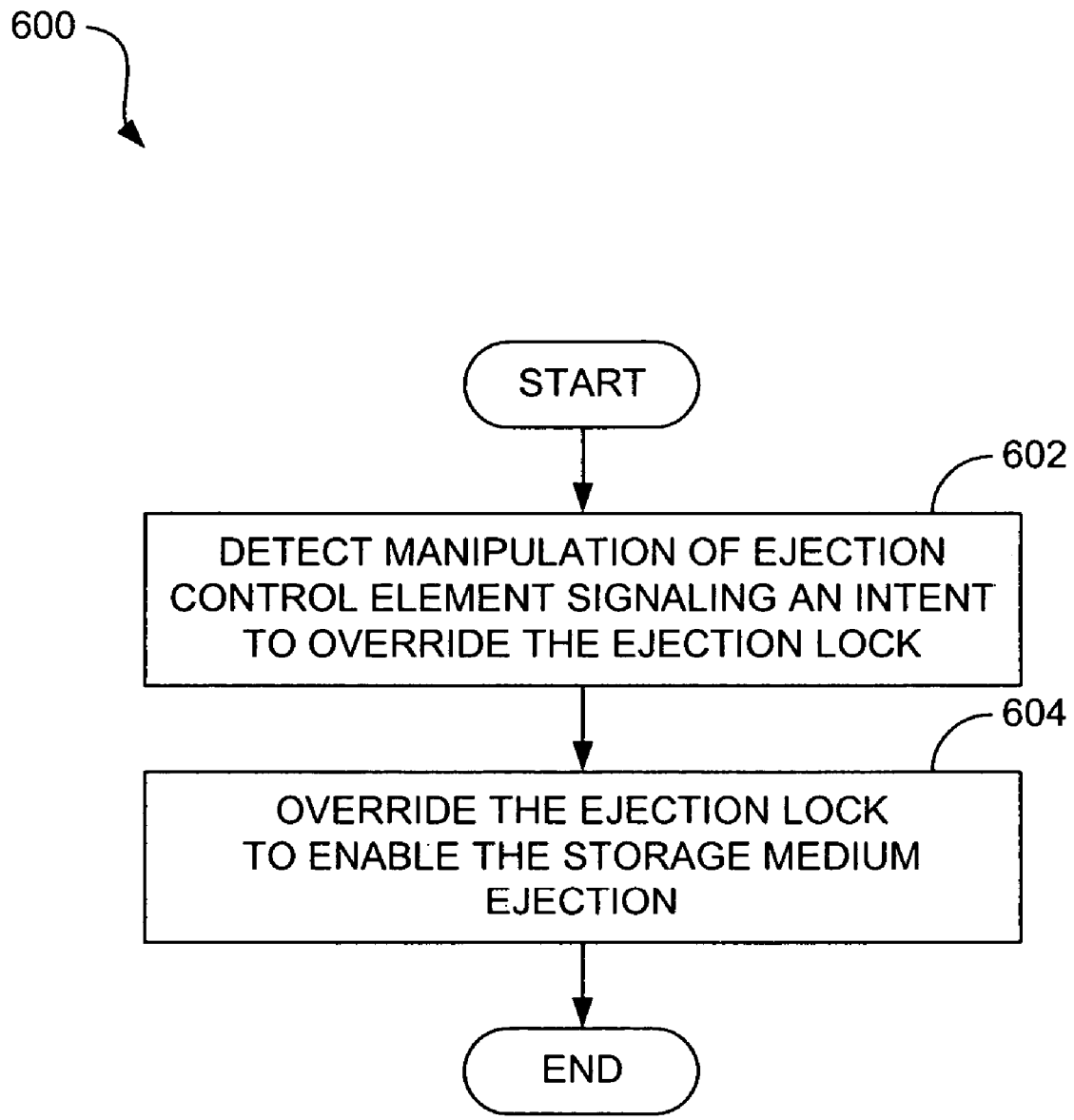
FIG. 6 is a flow diagram that illustrates a further embodiment of a method for overriding an ejection lock.

A further method 600 for overriding an ejection lock is described with reference to FIG. 6. As indicated in that figure, the method 600 comprises detecting manipulation of an ejection control element signaling an intent to override the ejection lock (block 602), and overriding the ejection lock to enable storage medium ejection (block 604).

What is claimed is:

1. A method for overriding an ejection lock acting upon a storage medium drive, the method comprising:
   detecting manipulation of an ejection control element that signals an intent to override the ejection lock; and
   overriding the ejection lock to enable storage medium ejection.

2. The method of claim 1, wherein detecting an active state of the ejection lock comprises detecting an active software-controlled lock operated by a computer operating system.

3. The method of claim 1, wherein detecting manipulation of an ejection control element comprises detecting atypical manipulation of an ejection control element used to eject storage media under normal operating conditions.

4. The method of claim 3, wherein detecting atypical manipulation of an ejection control element comprises detecting atypical manipulation of an eject button provided on a front panel of the storage medium drive.

5. The method of claim 4, wherein detecting atypical manipulation of an eject button comprises detecting depression and holding of the button.

6. The method of claim 4, wherein detecting atypical manipulation of an eject button comprises detecting multiple presses of the button that occur within a predetermined time period.

7. The method of claim 1, wherein overriding the ejection lock comprises executing a command stored in memory of the storage medium drive that overrides a lock command imposed by a computer operating system.

8. The method of claim 1, further comprising ejecting the storage medium.

9. A system for overriding an ejection lock, the system comprising:
   means for detecting manipulation of an ejection control element used to eject storage media under normal operating conditions, the manipulation indicating a user desire to override the software-based lock; and
   means for overriding the software-based lock to enable storage medium ejection in response to the detected manipulation.

10. The system of claim 9, wherein the means for determining comprise means for determining whether a computer operating system has imposed the software-based lock on the drive.

11. The system of claim 9, wherein the means for detecting manipulation of an ejection control element comprise means for detecting at least one of pressing and holding the ejection control element and pressing the ejection control element multiple times.

12. The system of claim 9, wherein the means for overriding comprise commands stored within and executed by the storage medium drive.

13. The system of claim 9, wherein the means for overriding comprise means for ejecting the storage medium.

14. A system stored on a computer-readable medium, the system comprising:
   logic configured to monitor the state of a storage medium drive to determine whether a software-based lock that prevents ejection is acting upon the drive;
   logic configured to monitor manipulation of a drive eject button; and
   logic configured to detect atypical manipulation of the eject button that communicates a desire to override the software-based lock.

15. The system of claim 14, wherein the logic configured to monitor manipulation of a drive eject button comprises logic configured to monitor a front panel eject button used to eject storage media from the storage medium drive under normal operating conditions.

16. The system of claim 14, wherein the logic configured to detect atypical manipulation of the eject button is configured to detect depression and holding of the button.

17. The system of claim 14, the logic configured to detect atypical manipulation of the eject button is configured to detect multiple presses of the button that occur within a predetermined time period.

18. The system of claim 14, further comprising logic configured to override the software-based lock to enable storage medium ejection when an appropriate atypical manipulation is detected.

19. The system of claim 14, further comprising logic configured to eject the storage medium.

20. A storage medium drive, comprising:
a storage medium ejection mechanism;
an eject button that is used to activate the ejection mechanism under normal operating conditions;
a processor; and
memory containing ejection lock override logic, the override logic being configured to detect an atypical manipulation of the eject button that signals a desire to override an ejection lock that has been imposed upon the storage medium drive, the override logic further being configured to eject a storage medium upon detection of that atypical manipulation.

21. The drive of claim 20, wherein the eject button is a finger-activated button that is provided in a front panel of the storage medium drive.

22. The drive of claim 20, wherein the drive is a compact disc (CD) drive.

23. The drive of claim 20, wherein the drive is a floppy disk drive.

24. A computer system, comprising:
a system processor;
system memory including an operating system; and
a storage medium drive including an eject button that is used to eject storage media from the drive under normal operating conditions and drive memory containing ejection lock override logic that is configured to detect atypical manipulation of the eject button that signals a desire to override an ejection lock that has been imposed upon the storage medium drive by the operating system.

25. The computer system of claim 24, wherein the storage medium drive is a compact disc (CD) drive.

* * * * *